Sept. 8, 1925.                      1,552,955
B. C. ROCKWELL
METHOD OF MANUFACTURING LUMBER
Filed Sept. 22, 1923
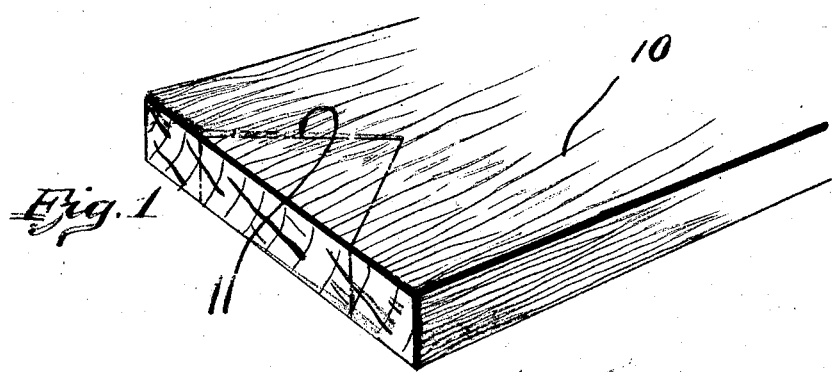
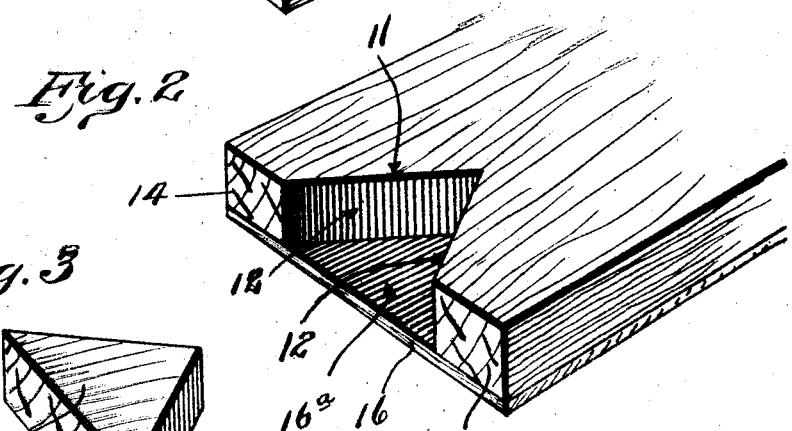
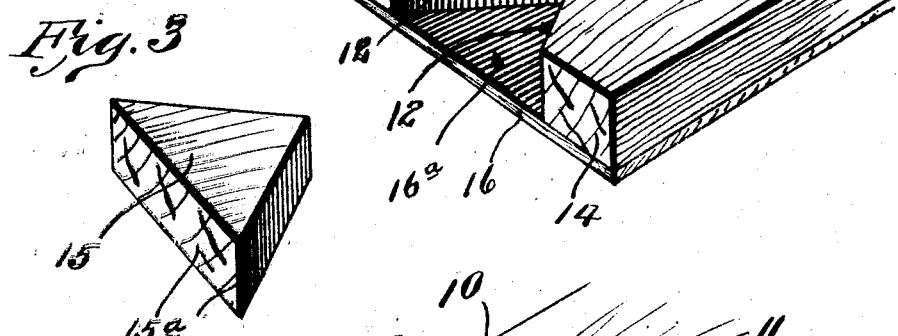
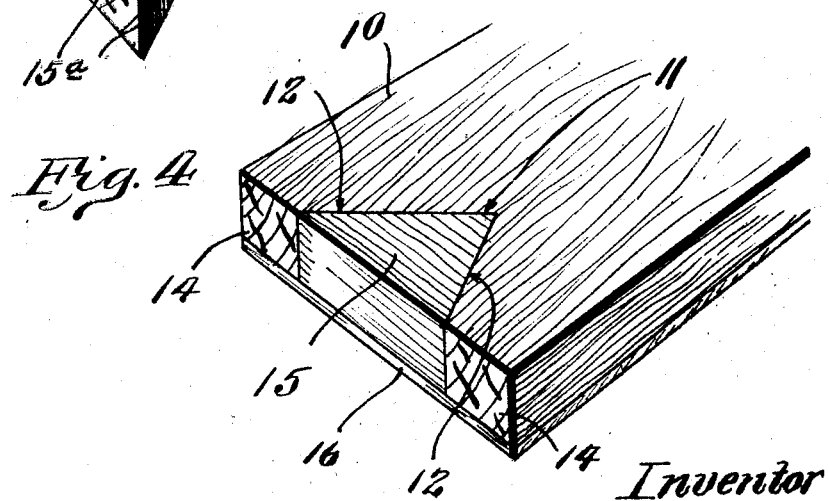
Inventor
Byrd C. Rockwell
By Cornwall, Bedell & Janney
Attys Patented Sept. 8, 1925.

1,552,955

UNITED STATES PATENT OFFICE.

BYRD C. ROCKWELL, OF ST. JOSEPH, MISSOURI.

METHOD OF MANUFACTURING LUMBER.

Application filed September 22, 1923. Serial No. 664,261.

*To all whom it may concern:*

Be it known that I, BYRD C. ROCKWELL, a citizen of the United States, residing at St. Joseph, Missouri, have invented a certain new and useful Improvement in Methods of Manufacturing Lumber, of which the following is a specification, such as will enable others skilled in the art to which it appertains to make and use the same.

This invention relates to the method of manufacturing architectural lumber and is particularly adapted for manufacturing veneered lumber cut to predetermined lengths.

The objects of the invention are to produce lumber stock cut to certain length requiring one clear face and clear edges, such as door jambs, and the ends of which are reinforced or cross-banded so as to prevent end-warping or cupping of said lumber.

Further objects of the invention are to provide a method of manufacturing veneered lumber which is simple and inexpensive to practice, which does not produce any waste lumber, and which effectively eliminates warping of said lumber, thereby permitting said lumber to be carried in stock for an indefinite length of time without danger of warping and damage to the lumber.

Still further objects of the invention are to saw out of each end of the core stock a section of material and then replace said section in the notch so formed but with the grain of said section disposed at an angle to the grain of the core body so that the grain of a portion of each end of said lumber does not run in the direction of the grain of the core body but at an angle or crosswise relative thereto.

With these and other objects in view, my invention consists in certain novel features of construction and arrangement of parts, hereinafter more fully described and claimed, and illustrated in the accompanying drawings, in which—

Figure 1 is a perspective detail view of one end of a piece of lumber indicating in dotted lines the saw cut.

Figure 2 is a similar view with a section of material removed therefrom and a veneered portion applied to one face of said lumber.

Figure 3 is a perspective detail view of the section cut out of one end of the core body.

Figure 4 is a perspective detail view of the finished lumber showing the section inserted in the end of the core body with the grain running at an angle to the grain of the core body.

The end-warping of lumber constitutes a serious defect, especially in case of architectural lumber which has been cut to predetermined lengths and kept in stock for a period of time. The warping starts at the ends of the lumber piece and if the warping or cupping of the ends of the lumber is prevented the lumber will retain its true shape. In order to prevent this end-warping of lumber, my invention contemplates the method whereby a notch of proper size is cut in each end of the core body intermediate the edges thereof and a block or section of wood, preferably the same piece formed by sawing out said notch, is inserted in the notch with its grain running crosswise or at an angle to the grain of the core body. The notch or saw cut is preferably V-shaped so that the block thus formed is of equilateral triangular shape and can be placed back in the notch with the grain disposed at an angle to the grain of the stock. Thus the same material is used over, thereby eliminating waste and the lumber so manufactured is prevented from warping and may be kept in stock for an indefinite time.

Referring by numerals to the accompanying drawings, 10 indicates a strip of lumber or core body cut to predetermined length and which is designed to form the body portion of the manufactured architectural lumber. In the ends of this core member are formed saw cuts or notches 11 which are preferably V-shaped and have their convergent sides 12 of the same length as the distance across the mouth of the notch or the inner edges of the remaining portions 14. An equilateral triangular shaped block 15 is thus formed as shown in Figure 3.

A veneer strip 16 is then applied to one face of core member 10 and the ends of said strip terminate flush with the ends of the core member 10 and overlie and cover one end of each notch 11 as shown in Figure 2. The triangular block 15 is then placed in the corresponding notch 11 but instead of occupying its former position it is turned so that its grain runs at an angle to the grain of the core body, as shown in Figure 4.

The block is secured in position by means of suitable adhesive which may be applied to the inner exposed face portion 16ª of strip 16 or to the proper side walls 15ª of block 15 or to both.

The formation of V-shaped notches insures the proper seating of the blocks and the formation of block 15 so that its sides are even permits the use of the block in the same notch from which it has been removed, thereby eliminating waste of material and reducing the cost of time and labor involved. The positioning of the blocks in the notches of the core body with the grain running at an angle to the grain of said core body destroys the tendency of the ends of the lumber stock to warp by virtue of the displacement of the grain of the blocks relative to the grain of the core body.

I claim:

1. The method of treating lumber stock of predetermined length consisting in forming in the ends of a core member notches at right angles to the plane thereof, said notches having convergent sides and placing therein similarly shaped insert pieces in plane with said core body the grain of said insert pieces running at an angle to the grain of said core member.

2. The method of reinforcing veneered lumber consisting in sawing V-shaped notches in the ends of a core body at right angles to the plane thereof and placing therein V-shaped blocks with the grain thereof disposed crosswise to the grain of the core member.

3. The method of reinforcing architectural lumber of predetermined length consisting in forming V-shaped notches in the ends of a core body, placing therein V-shaped blocks of material with the grain thereof disposed at an angle to the grain of said core body, and applying a veneer strip to one face of said core body thereby covering one side of said block and providing a clear face for said lumber.

4. The method of treating architectural veneered lumber of predetermined length consisting in forming V-shaped notches in the ends of a core body, applying a veneer strip to one face of said core body thus covering one side of each notch, and then securing by a suitable adhesive V-shaped blocks of material in said notches with the grain of said blocks disposed at an angle to the grain of said core body.

5. The method of reinforcing architectural lumber consisting of sawing out of the ends of a core member equilateral triangular blocks, and then replacing said blocks in the respective notches with the grain of said blocks disposed crosswise with respect to the grain of said core body.

6. The method of reinforcing veneered lumber consisting in sawing V-shaped notches in the ends of a core member, applying a veneer strip to one face of said core member, said strip overlying and covering one side of each notch, then securing in each notch similarly shaped blocks of material.

In testimony whereof I hereunto affix my signature this seventeenth day of September, 1923.

BYRD C. ROCKWELL.